United States Patent
Dunham

(10) Patent No.: US 11,017,475 B1
(45) Date of Patent: May 25, 2021

(54) SYSTEMS AND METHODS FOR ANALYZING AND VISUALIZING TRAFFIC ACCIDENT RISK

(71) Applicant: UIPCO, LLC, San Antonio, TX (US)

(72) Inventor: Susan Dunham, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 747 days.

(21) Appl. No.: 15/284,815

(22) Filed: Oct. 4, 2016

Related U.S. Application Data

(60) Provisional application No. 62/237,696, filed on Oct. 6, 2015.

(51) Int. Cl.
*G06Q 40/08* (2012.01)

(52) U.S. Cl.
CPC ................... *G06Q 40/08* (2013.01)

(58) Field of Classification Search
CPC ..................................................... G06Q 40/08
See application file for complete search history.

(56) References Cited

U.S. PATENT DOCUMENTS

| | | | | |
|---|---|---|---|---|
| 2010/0332131 A1* | 12/2010 | Horvitz | ............. | G01C 21/3484 701/414 |
| 2011/0208646 A1* | 8/2011 | McMaster | ............. | G06Q 20/10 705/39 |
| 2013/0332058 A1* | 12/2013 | Prestor | ................ | G08G 1/0962 701/118 |
| 2016/0086285 A1* | 3/2016 | Jordan Peters | ........ | G06Q 40/08 705/4 |
| 2016/0189303 A1* | 6/2016 | Fuchs | .................... | G06Q 40/08 705/4 |
| 2016/0195406 A1* | 7/2016 | Miles | ................. | G06Q 10/0639 701/537 |
| 2017/0011465 A1* | 1/2017 | Anastassov | ........ | G06Q 10/0639 701/537 |
| 2017/0089710 A1* | 3/2017 | Slusar | ...................... | B60R 1/00 |

FOREIGN PATENT DOCUMENTS

WO    WO-2017053422 A1 *   3/2017   ......... G01C 21/3461

OTHER PUBLICATIONS

Ke Nie Et Al., A Network-Constrained Integrated Method for Detecting Spatial Cluster and Risk Location of Traffic Crash: A Case Study from Wuhan, China, Mar. 4, 2015, Sustainability, ISSN 2071-1050, p. 2662-2677 (Year: 2015).*

* cited by examiner

*Primary Examiner* — Hani M Kazimi
*Assistant Examiner* — Adam Hilmantel
(74) *Attorney, Agent, or Firm* — Perkins Coie LLP

(57) ABSTRACT

Methods and systems described in this disclosure determine area with an elevated risk of being involved in an accident, where a driver of an insured vehicle is expected to drive the insured vehicle through the area. The elevated risk may be a risk with a risk score greater than a first threshold. An alternative route that avoids the area of elevated risk can be determined. In some embodiments, an insurance discount is calculated for the policyholder of the insured vehicle if the alternative route is taken. A visual representation of the alternative route and the insurance discount if the alternative route is taken can be generated.

20 Claims, 6 Drawing Sheets

SYSTEMS AND METHODS FOR ANALYZING AND VISUALIZING TRAFFIC ACCIDENT RISK

CROSS-REFERENCE TO RELATED APPLICATIONS

This application is a non-provisional of and claims priority to U.S. Provisional Application No. 62/237,696, filed on Oct. 6, 2015, entitled "SYSTEMS AND METHODS FOR ANALYZING AND VISUALIZING TRAFFIC ACCIDENT RISK," which is hereby incorporated by reference in its entirety for all purposes.

TECHNICAL FIELD

Various embodiments of the present disclosure generally relate to driving. More specifically, various embodiments of the present disclosure relate to methods and systems for analyzing and visualizing traffic accident risk.

BACKGROUND

Insurance companies often base vehicle insurance rates on numerous factors, such as driving history, age, type of vehicle, amount of coverage, and location. The more risk the insurance company incurs by insuring the vehicle, the higher the premium. Some factors are environmental factors and cannot be controlled by the insured. For example, insurance is more expensive in certain states because more accidents occur in those states.

BRIEF DESCRIPTION OF THE DRAWINGS

Embodiments of the present disclosure will be described and explained through the use of the accompanying drawings in which.

DETAILED DESCRIPTION

Figure 1:
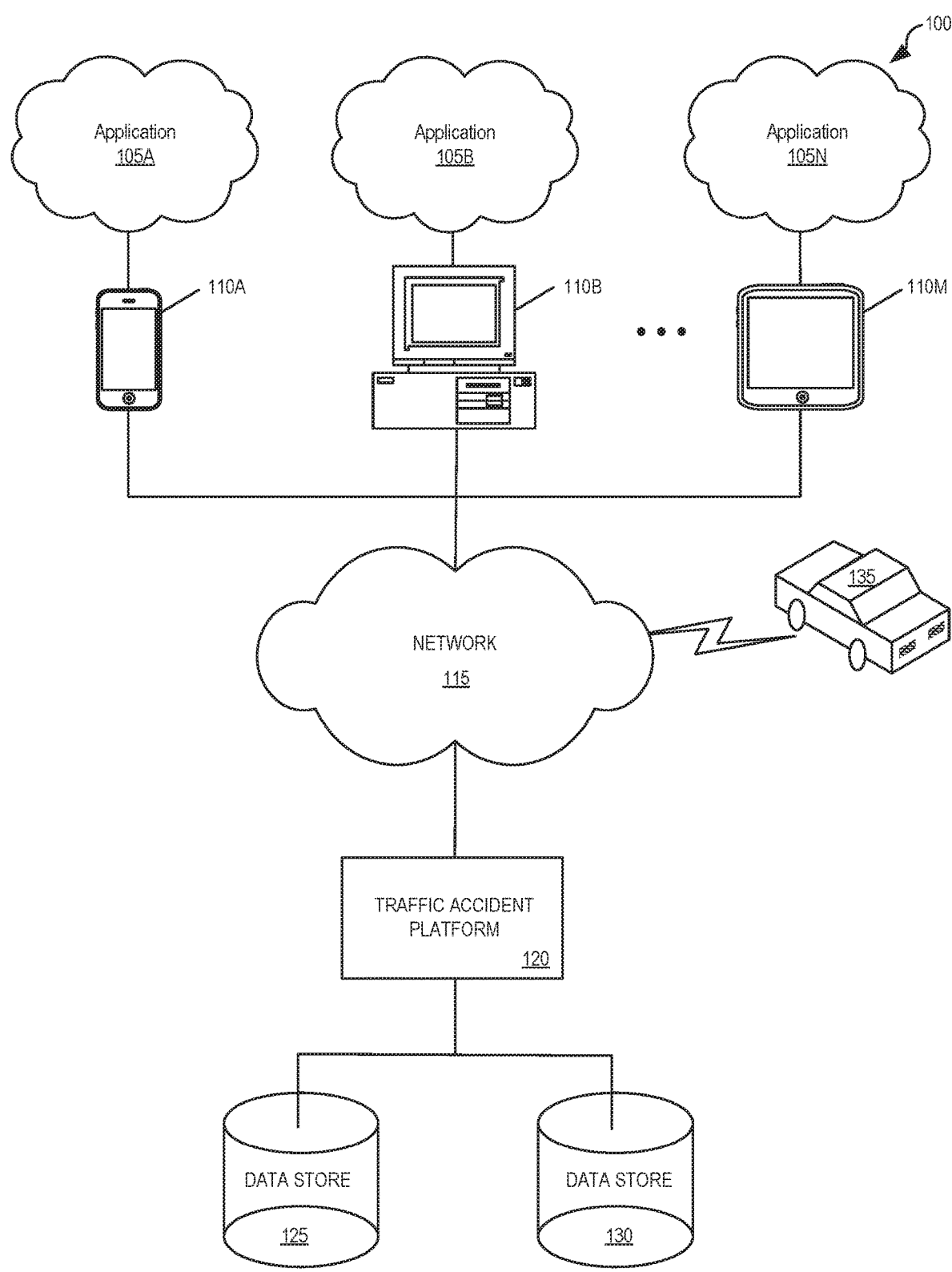
FIG. 1 illustrates an example of a network-based operating environment in accordance with various embodiments of the disclosure.

Various embodiments of the present disclosure generally relate to driving. More specifically, various embodiments of the present disclosure relate to methods and systems for analyzing and visualizing traffic accident risk.

Today, some insurance companies offer products that monitor driving habits of the driver to determine a risk of insuring the driver. Insurance rates can then be adjusted to account for this risk (e.g., the higher the risk, the higher the rate). For example, a speed or brake sensor may monitor and transmit the insured's average speed or pressure applied to brake to the insurance company. If the insured keeps speeds low and does not slam on the brakes, the insured may be offered lower insurance rates. This approach, while helpful in rewarding good drivers, does not prevent the driver from being in an accident.

Embodiments of this disclosure prevent accidents and lower insurance rates by determining which areas (e.g., intersections, streets, roads, highways or stretches thereof) have a high likelihood of being in an accident. Some areas are more dangerous than other routes. A score reflecting a likelihood of being involved in an accident may be calculated. The score may be based on factors such as street size, number of incidents in the area, severity of the incidents in the area, time of day, demographics of people living or driving near the area, and driving conditions (e.g., weather, construction, potholes). By analyzing data and determining the score that indicates a likelihood of being involved in an accident, drivers can be alerted of the risk.

In some embodiments, information regarding the safety of areas is analyzed and the area is scored according to a risk level of being involved in an accident. The scores can indicate a high, medium, or low level of risk. The driver's location can be tracked (e.g., via cell phone triangulation, GPS on the vehicle) to determine the user's routes. The system may analyze the routes of a driver of an insured vehicle to determine if a driver is expected to drive the vehicle through a high or medium risk area. Alternative routes with a lower risk of being involved in an accident may be determined and presented to a user.

A notification notifying the driver of the risk and the alternative route may be sent to a device associated with the driver or policy holder of the insured vehicle. In some embodiments, the notification may be delivered via a communications system in the insured vehicle. The routes and indications of the risk of being involved in an accident may be presented to the user in a map. In some embodiments, insurance discounts are offered for taking the safer route. The vehicle and/or user's device may be tracked to determine whether the high risk area was avoided, and the insurance rates may be adjusted accordingly.

Methods and systems disclosed herein allow users and/or insurance companies to analyze traffic risk and provide visualizations of the risk to the drivers of insured vehicles, allowing for fewer accidents and lower insurance rates.

This disclosure describes vehicle configuration processes designed to increase safety by preventing accidents. Various embodiments may provide one or more of the following technological improvements: 1) improved safety in insured property, 2) improved processes for assessing accident risk, 3) improved methods of displaying the safety level of driving in certain areas, 4) improved accuracy and efficiency in designing and pricing vehicle insurance policies, and 5) improved communication between the policyholder and the insurance company.

In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details. For example, the disclosure refers to a "driver." However, the system may be used by passengers or other users.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; a wearable device such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to vehicle 135, traffic accident platform 120, and data stores 125 and 130.

Computing devices 110A-110M may be configured to communicate via the network 115 with traffic accident platform 120. In some embodiments, computing devices 110A-110M can retrieve or submit information to traffic accident platform 120 and run one or more applications with customized content retrieved by traffic accident platform 120 and data stores 125 and 130. For example, computing devices 110A-110M can execute a browser application or a customized client to enable interaction between the computing devices 110A-110M, traffic accident platform 120, and data stores 125 and 130.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Traffic accident platform 120 can be running on one or more servers and can be used to gather information regarding traffic accidents, score areas according risk, identify drivers expected to drive through high risk areas, determine alternative routes, calculate discounts for taking the alternative route, notify the driver and/or the policyholder of the discount and the alternative route, generate a map displaying routes with the risk level indicated on the route, track the vehicle, determine whether the alternative route was followed, provide insurance discounts, store profiles and/or policies in data stores 125 and 130, and/or perform other activities. In some embodiments, traffic accident platform 120 includes various data processing and analytic tools that allow for insurance rate determination and discounts. In some embodiments, traffic accident platform 120 is a server.

Traffic accident platform 120 may be communicably coupled with vehicle 135, data stores 125 and 130, and computing devices 110A-110M, and may communicate, access, or receive data (e.g., driver identification, vehicle configurations, vehicle driving data, vehicle locations, driver profiles, insurance rates) from vehicle 135, computing devices 110A-110M and data stores 125 and 130. Traffic accident platform 120 may be associated with a membership organization, and the drivers may be members of the membership organization. The organization may be a financial institution and/or an insurance company.

Traffic accident platform 120 may be customized or calibrated by individual companies or service providers based on user needs and/or business objectives. For example, companies may have different business rules and/or different criteria for determining risk levels and insurance rates.

Data stores 125 and 130 can be used to manage storage and access to user data such as driver history, insurance policies, registered user devices, configuration profiles, type and number of vehicles insured, payment history, outstanding bills, and other information. Data stores 125 and 130 may be a data repository of a set of integrated objects that are modeled using classes defined in database schemas. Data stores 125 and 130 may further include flat files that can store data. Traffic accident platform 120 and/or other servers may collect and/or access data from the data stores 125 and 130.

Vehicle 135 may be any type of vehicle. Vehicle 135 may also be capable of communicating with a server or other system (e.g., traffic accident platform 120) to receive maps illustrating high, low, and medium risk areas. Vehicle 135 may display the driver's typical or programmed route overlaid with indications of high, low, and medium risk areas (e.g., red, green, yellow). Vehicle 135 may also be used to notify the user of the alternative route by displaying the map with an alternative route. The map may indicate insurance discounts for taking one route over another. Vehicle 135 may include sensors/detectors or a network of sensors/detectors to detect the vehicle's location and/or operational status. In some embodiments, the sensors collect data and provide the data to the vehicle and/or to traffic accident platform 120.

Figure 2:
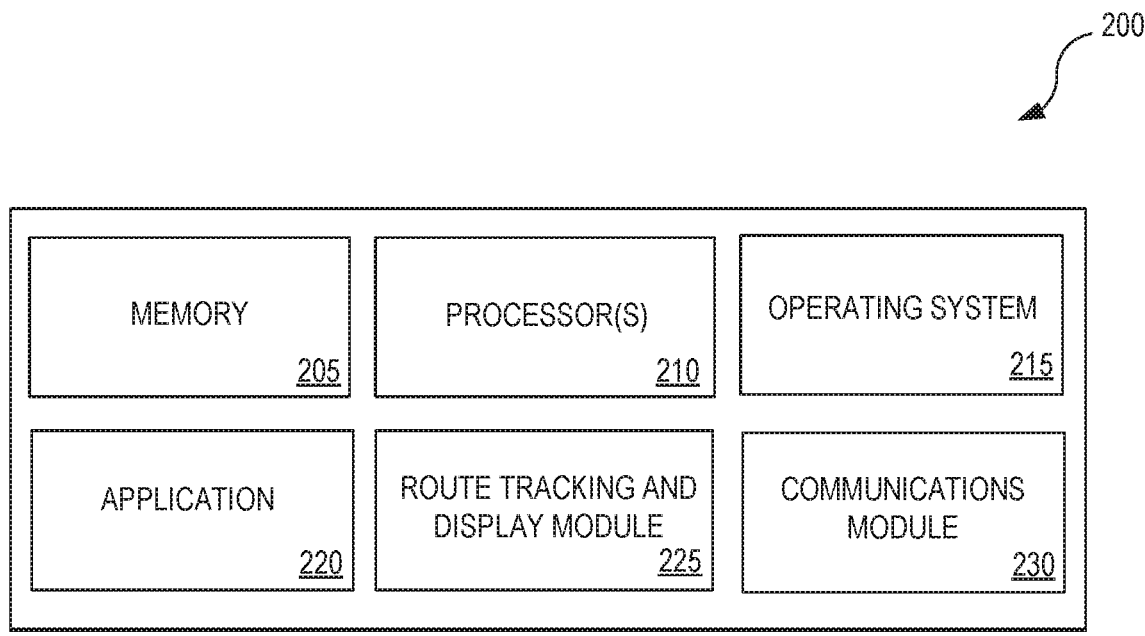
FIG. 2 illustrates various components of a computing device that may be used in accordance with one or more embodiments of the disclosure.

FIG. 2 illustrates a set of components 200 within computing device 110 according to one or more embodiments of the present disclosure. Computing device 110 may be integrated into or used in connection with vehicle 135. According to the embodiments shown in FIG. 2, computing device 110 can include memory 205, one or more processors 210, operating system 215, application 220, route tracking and display module 225, and communications module 230. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, application 220 and route tracking and display module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, route tracking and display module 225, and communications module 230.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with traffic accident platform 120. For example, application 220 can include an application for a traffic mapping service, financial services, a money transfer application, a social networking application, and a gaming application.

Application 220 can access a server and/or a platform associated with an organization (e.g., traffic accident platform 120) to retrieve insurance account/policy details, receive notifications with alternative routes insurance discounts, and identify the driver for the organization. For example, application 220 may be used to identify a person as a driver. Identifying the driver to the organization may help determine which route the driver is expected to take (e.g., Driver A typically drives to work at 7:00 a.m.). The driver could place device 200 into a position in the vehicle and identify the driver using biometrics or other means. Or, the driver could be identified using geolocation or cell phone triangulation. In some embodiments, device 200 sends a signal to a vehicle and/or to the server when device 200 detects that the user is in the driver's seat. In some embodiments, application 220 may collect biometric samples to identify the driver such as a voice, eye movement, fingerprints, behavioral biometrics (e.g., keystrokes), etc.

Route tracking and display module 225 can generate one or more graphical user interface (GUI) screens that allow for interaction with a driver or other user. For example, route tracking and display module 225 displays a visual analysis of the risk of being involved in an accident on one or more routes. The visual analysis may be presented on a map with colors representing the likelihood of an accident (e.g., red represents a high likelihood of an accident, yellow represents a medium likelihood of an accident, green represents a low likelihood of an accident). In some embodiments, route tracking and display module 225 are used in combination with a traffic map or navigation system. For example, speed of traffic may be indicated by red, yellow, and green and the risk of being involved in an accident may be indicated by magenta, orange and blue (e.g., indicated next to the speed of traffic indications). Route tracking and display module 225 may indicate the driver's expected route (e.g., the driver's typical route), route indicated by the driver (driver programs the route into computing device 110), and/or the suggested alternative route to avoid the areas of high risk of being involved in an accident. Route tracking and display module 225 may track the driver's location and may communicate the location and/or the driver's route to traffic accident platform 120. In some embodiments, the driver may select a route via route tracking and display module 225. Route tracking and display module 225 can display notifications regarding the savings or discounts the driver may receive from the insurance company by taking the safer route (i.e., the route with the lower risk of being involved in an accident).

Communications module 230 can exchange communication with the vehicle (e.g., vehicle 135) and/or a server or other system (e.g., traffic accident platform 120). For example, communications module 230 may send a communication to traffic accident platform 120 or vehicle 135 communicating the identity of the person driving, so the expected route may be determined based on a profile. In some embodiments, communications module 230 communicates a route selected by the driver via route tracking and display module 225 to the vehicle 135 and/or traffic accident platform 120. Communications module 230 can receive notifications displayed by route tracking and display module 225.

Figure 3:
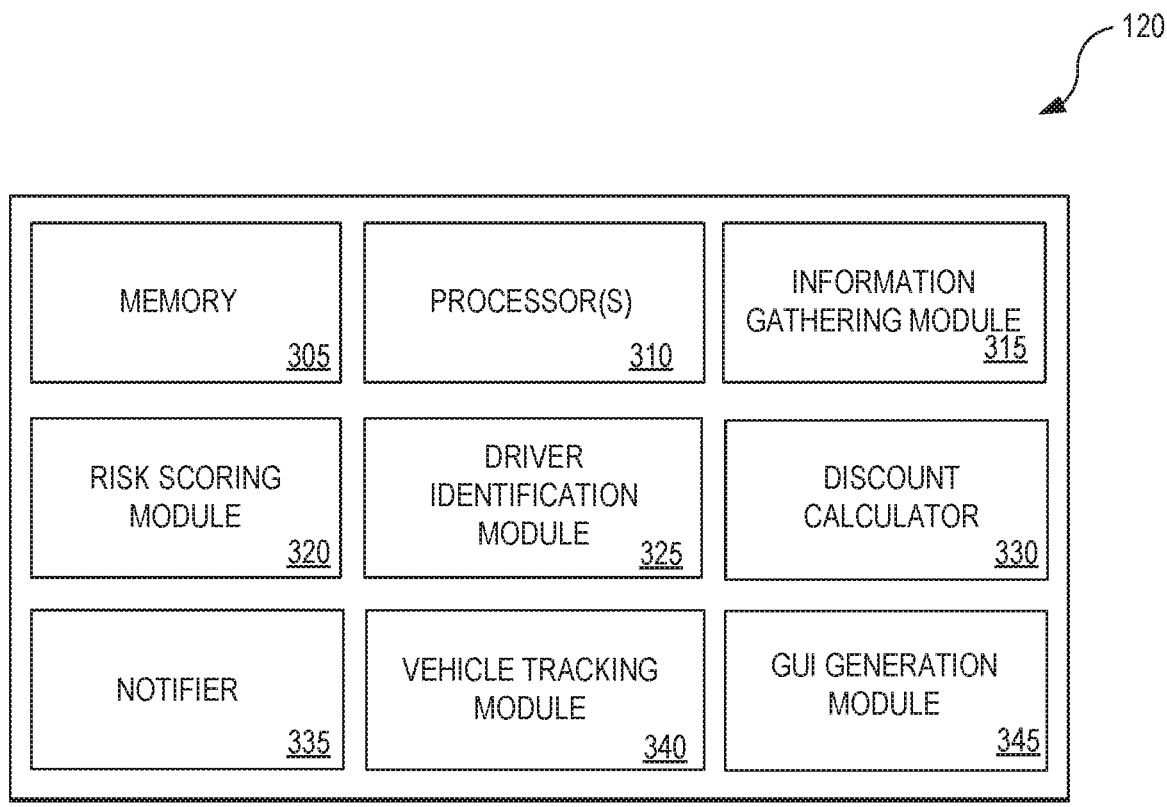
FIG. 3 illustrates various components of a traffic accident platform that may be used in accordance with various embodiments of the present disclosure.

FIG. 3 illustrates a set of components within traffic accident platform 120 according to one or more embodiments of the present disclosure. According to the embodiments shown in FIG. 3, traffic accident platform 120 can include memory 305, one or more processors 310, information gathering module 315, risk scoring module 320, driver identification module 325, discount calculator 330, notifier 335, vehicle tracking module 340, and GUI generation module 345. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of information gathering module 315, risk scoring module 320, driver identification module 325, discount calculator 330, notifier 335, vehicle tracking module 340, and GUI generation module 345.

Information gathering module 315 can gather information to assist with determining which areas (e.g., routes, roads, intersections, streets, highways) have a high likelihood of vehicular accidents. Sources may include police reports, insurance companies, the public, social media (e.g., blog posts, Facebook), traffic reports, video cameras, news channels, speed sensors, and drones. Information gathering module 315 can communicate the information to risk scoring module 320 for analysis.

Risk scoring module 320 can analyze data received from information gathering module 315 and determine the risk of being involved in a vehicular accident in an area (i.e., high risk indicates a high likelihood of being involved in an accident). The analysis may be based on the street size, number of previous incidents/accidents (e.g., during a predetermined period of time) in the area, previous incident/accident severity, time of day, demographics of the surrounding area or drivers in the area, driving conditions (e.g., weather, construction, potholes), type of vehicle being driven, age of driver, and number of previous accidents of the driver. Some factors may be weighed higher than others. In some embodiments, a risk score may be customized for the user (e.g., including factors such as type of vehicle being driven, number of previous accidents).

In some embodiments, risk scoring module 320 uses a statistical method to determine the risk. For example, risk scoring module 320 can calculate the Getis-Ord Gi* statistic for each factor or feature in a dataset. The resultant score determines where features with either high or low values cluster spatially. To identify an area with a high risk score, a factor will have a high value and be surrounded by other features with high values as well. Using the Getis-Ord GI* statistic, the local sum for a factor and its neighbors is compared proportionally to the sum of all features; when the local sum is much different than the expected local sum, and that difference is too large to be the result of random chance, a statistically significant risk score (i.e., high risk score) results.

The Getis-Ord local statistic is given as:

$$G_i^* = \frac{\sum_{j=1}^{n} w_{i,j} x_j - \overline{X} \sum_{j=1}^{n} w_{i,j}}{S \sqrt{\left[\frac{n \sum_{j=1}^{n} w_{i,j} - \left(\sum_{j=1}^{n} w_{i,j}\right)^2}{n-1}\right]}} \quad (1)$$

where $x_j$ is the attribute value for feature j, $w_{i,j}$ is the spatial weight between feature i and j, n is equal to the total number of features and:

$$\overline{X} = \frac{\sum_{j=1}^{n} x_j}{n} \quad (2)$$

$$S \sqrt{\frac{\sum_{j=1}^{n} x_j^2}{n} - (\overline{X})^2} \quad (3)$$

The $G_i^*$ is a z-score so no further calculations are required.

Reports of the risk may be compiled where the risk is broken down by time of day, weather events, or other factors.

After an area is scored, risk scoring module 320 may determine whether the score qualifies as a high, medium, or low level risk based on various thresholds (e.g., if the score is at or above a first threshold, the risk is high; if the score is lower than the first threshold, but at or higher than a second threshold, the risk is medium; if the score is lower than the second threshold, the risk is low). The thresholds may vary by county, city, state, insurer, insurance company, intersection, and/or neighborhood. In some embodiments, the threshold can vary depending on the amount of losses that an insurance company has covered in a particular location or a number of accidents in a particular location. The threshold could be set based on a number of accidents (e.g., 15 or more accidents at one intersection in the past 10 years is considered a high risk). In some embodiments, the risk score is determined for an entire route (e.g., if one or more areas are at a high risk, the route is considered a high risk). In response to determining that a route or a portion of the route is a high risk, risk score module 320 may score alternative routes to determine a safer alternative route.

Driver identification module 325 can determine an identity of a driver. The identity of the user may be used to determine a route the driver is expected to take based on a profile of the driver. For example, some users may take a certain route at certain times of the days (e.g., 7:00 a.m. for work or school). The identity of the driver may be received from the vehicle or a user device, or alternatively, identifying information may be received by driver identification module 325 and determined from the identifying information. The driver may be identified by the use of a particular key inserted in the vehicle, a selection from a list of drivers via the vehicle or a user device, a biometric sample (e.g., fingerprints on the steering wheel, a video or picture when the driver sits in the driver's seat, driver speaks), or location of a mobile device.

Discount calculator 330 can generate a discount to be applied to the policyholder's insurance rates if the user takes the safer route or otherwise avoids high/medium risk areas. The discount may be applied as an incentive for the driver to avoid the high risk area, potentially saving the driver from an accident and saving the insurance company money in potential insurance claims resulting from an accident. In some embodiments, the discount may be applied if the driver avoids the high risk area for a certain period of time (e.g., while there is ongoing construction, during the winter months, during high peak traffic times). In some embodiments, the discount applies for certain drivers or for all drivers of an insured vehicle. In some embodiments, the policyholder's insurance rates may go up if the insured vehicle is continually driven through high risk areas and/or the policy may cover less of the damages for any insurance claim made resulting from an accident occurring in any area identified as a high risk area.

Notifier 335 can send a notification to a device (e.g., computing device 110) associated with the driver or policyholder of the insured vehicle regarding the safety of the expected route or routes in the driver's profile. Notifier 335 may send the notification via text message, email, or vehicle communication system.

Vehicle tracking module 340 can monitor the vehicle and determine when the vehicle is approaching or is in a high risk area. The driver may be warned by notifier 335 after passing a predetermined threshold (e.g., the driver is within one mile of a high risk area). In some embodiments, the policyholder may receive a notification about the driving in the high risk areas or the lack thereof and the resulting insurance rate decrease/increase. Vehicle tracking module 340 can track the vehicle using GPS, cell phone triangulation, or other methods.

GUI generation module 345 is capable of generating one or more GUI screens that allow for interaction with a user. In at least one embodiment, GUI generation module 345 generates a graphical user interface receiving and/or conveying information to the user. For example, GUI generation module 345 may display the areas of high risk of getting into an accident, various routes, alternative routes, terms of the coverage of the insured, profiles for the drivers including expected routes for each driver of the insured vehicle, the notifications that have been sent, and a location of the vehicle.

Figure 4:
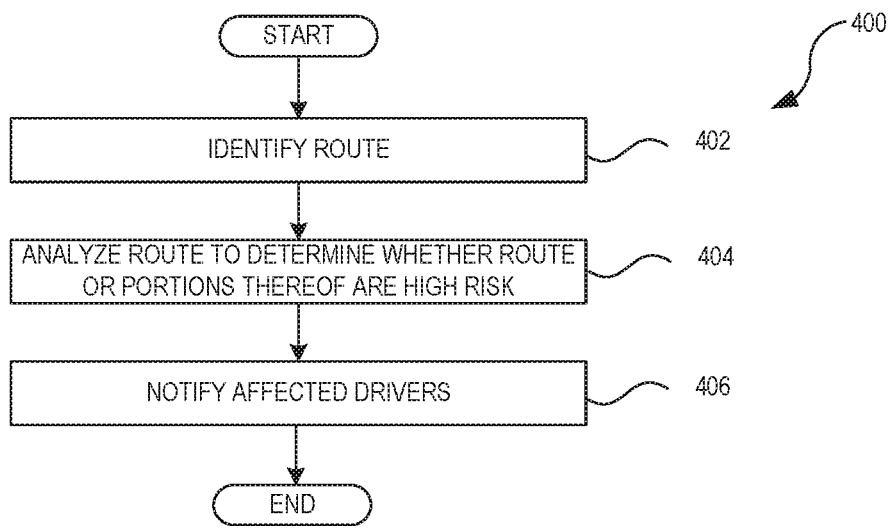
FIG. 4 is a flowchart illustrating a set of operations in accordance with various embodiments of the disclosure.
Figure 5:
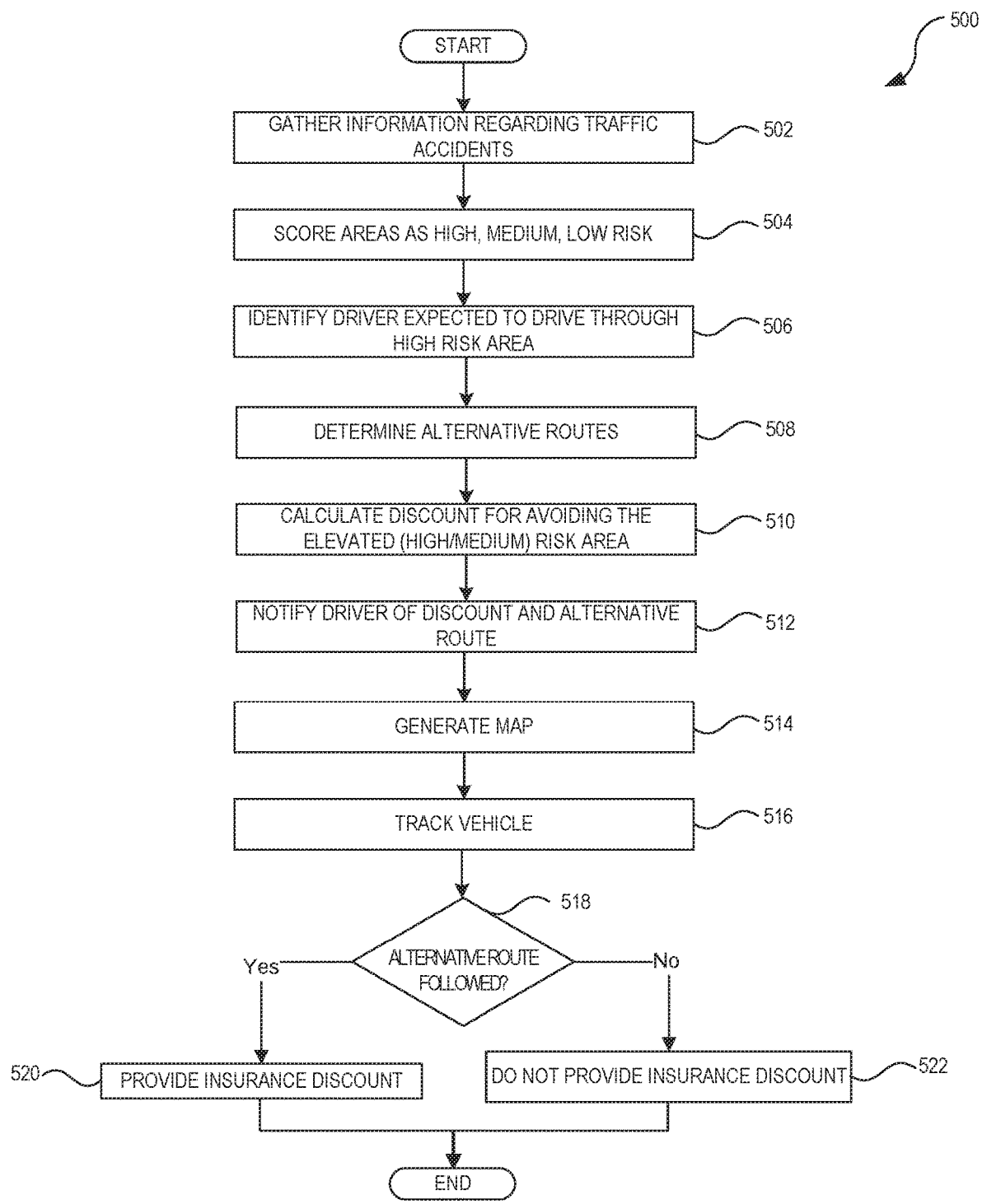
FIG. 5 is a flowchart illustrating a set of operations in accordance with various embodiments of the disclosure.

FIGS. 4-5 are flowcharts illustrating sets of operations for analyzing traffic accident risk. In some embodiments, fewer than all of the operations in each set of operations are performed, whereas in other embodiments additional operations are performed. Moreover, in some embodiments, the operations may be performed in different orders or in parallel. The operations can be performed by device 200 illustrated in FIG. 2, vehicle 135, and/or various components of traffic accident platform 120 illustrated in FIG. 3.

FIG. 4 is a flowchart illustrating a set of operations 400 for analyzing traffic accident risk. Identifying operation 402 identifies routes that a driver takes in an insured vehicle (e.g., based on a profile). Analyzing operation 404 analyzes the route to determine whether the routes or portions thereof are at an elevated risk level of being involved in an accident using a risk analysis. Notifying operation 406 notifies the driver of the status of the routes the driver takes and makes recommendations for safer routes, if any.

FIG. 5 is a flowchart illustrating a set of operations 500 for analyzing and visualizing traffic accident risk. Gathering operation 502 gathers information regarding traffic accidents from sources such as police reports, traffic channels, insurance providers, users, social media sources, speed sensors, and video surveillance. Scoring operation 504 scores areas (e.g., intersections, blocks, streets) according to the risk of being involved in an accident in the area. The risk may be based on a previous number of accidents in the area during a past predetermined period of time, the time of day, driving conditions, and/or age or skill of the driver. The scores may indicate whether there is a high, medium, or low risk/likelihood of being involved in an accident.

When areas are indicated as having an elevated likelihood of being involved in an accident (e.g., medium or high level of risk), identifying operation 506 identifies drivers that are expected to drive through these areas. This may be based on profiles of drivers, place of residence, employment or school, vehicle location, and/or navigation system indications. Determining operation 508 determines alternative routes to avoid the areas of elevated risk. Calculating operation 510 calculates discounts for avoiding the areas of elevated risk (e.g., taking a route with the lowest level of risk results in the largest discount). Notifying operation 512 notifies the driver of the discount(s) and the alternative route(s). Generating operation 514 generates a map of the various routes. In some embodiments, the discounts are overlaid on the map. In some embodiments, the safety of each portion of the route is indicated by colors. The map may be displayed on a device associated with the vehicle, driver, passenger, and/or policyholder.

Tracking operation 516 tracks the vehicle to determine if the user is approaching, driving, or has driven through an area of high risk of an accident. The tracking may be done by GPS, cell phone triangulation, or other methods of determining location. Decision block 518 determines whether a safer, alternative route is being or has been followed by the driver. If an alternative route has been followed, providing operation 520 provides an insurance discount. On the other hand, if the alternative route has not been followed, no insurance discount is provided in non-providing operation 522.

Computer System Overview

Figure 6:
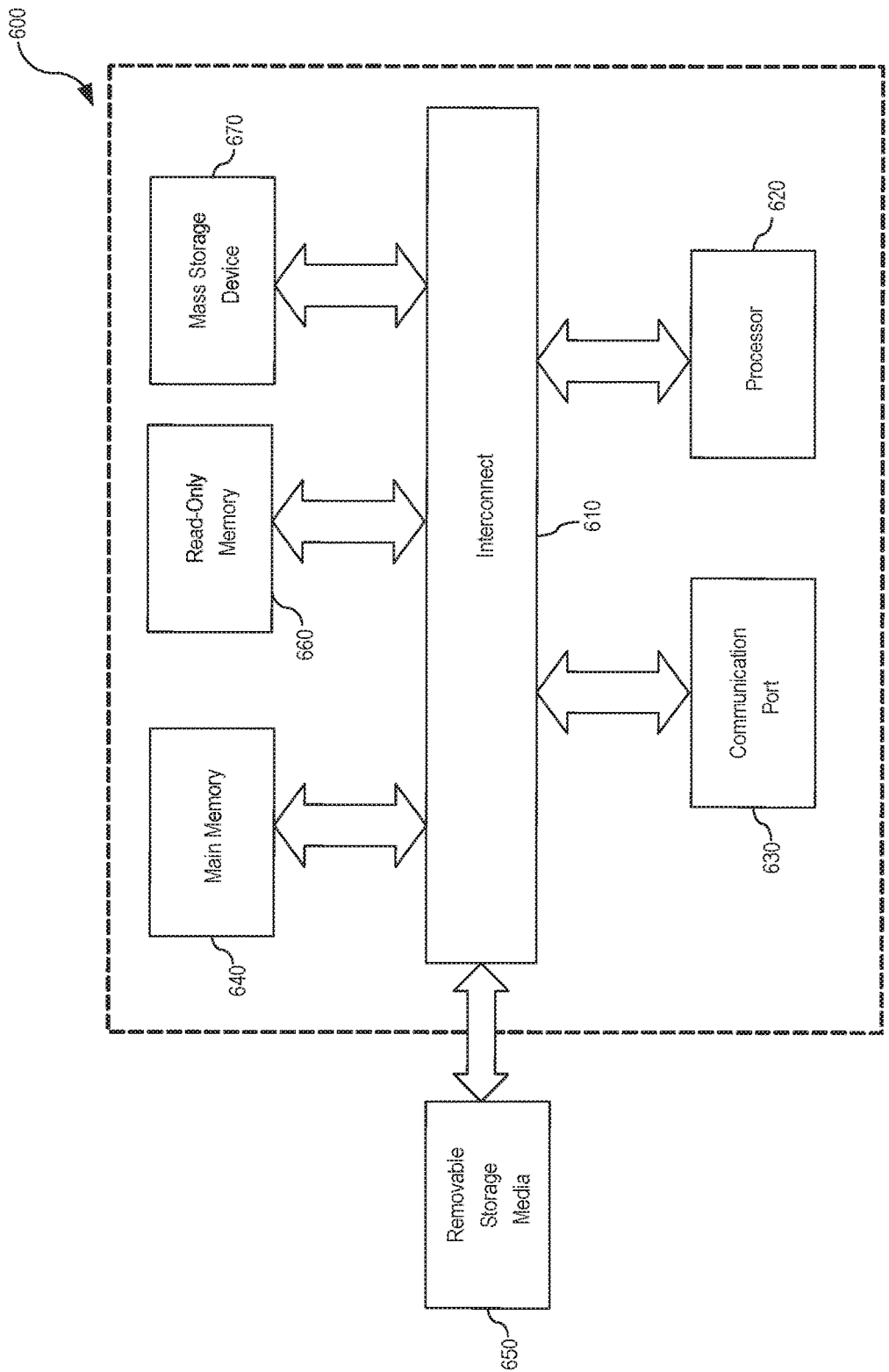
FIG. 6 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present disclosure may be utilized. According to the present example, the computer system includes an interconnect 610, at least one processor 620, at least one communication port 630, a main memory 640, a removable storage media 650, a read-only memory 660, and a mass storage 670.

Processor(s) 620 can be any known processor, such as, but not limited to, an Intel® Itanium® or Itanium 2® processor(s), or AMD® Opteron® or Athlon MP® processor(s), or Motorola® lines of processors. Communication port(s) 630 can be any of an RS-232 port for use with a modem-based dial-up connection, a 10/100 Ethernet port, or a Gigabit port using copper or fiber. Communication port(s) 630 may be chosen depending on a network such as a Local Area Network (LAN), Wide Area Network (WAN), or any network to which the computer system 600 connects.

Main memory 640 can be Random Access Memory (RAM) or any other dynamic storage device(s) commonly known in the art. Read-only memory 660 can be any static storage device(s) such as programmable read-only memory (PROM) chips for storing static information, such as instructions for processor 620.

Mass storage 670 can be used to store information and instructions. For example, hard disks such as the Adaptec® family of SCSI drives, an optical disc, an array of disks such as RAID, the Adaptec family of RAID drives, or any other mass storage devices may be used.

Interconnect 610 communicatively couples processor(s) 620 with the other memory, storage, and communication blocks. Interconnect 610 can be a PCI/PCI-X- or SCSI-based system bus, depending on the storage devices used.

Removable storage media 650 can be any kind of external hard-drives, floppy drives, IOMEGA® Zip Drives, compact disc read-only memory (CD-ROM), compact disc re-writable (CD-RW), or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for analyzing and visualizing traffic accident risk. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computerized method comprising:
    identifying, by a processor, that a driver of an insured vehicle is expected to drive the insured vehicle through an area with a high risk of being involved in an accident,
        wherein the high risk is a risk with a risk score greater than a first threshold, and wherein the first threshold is varied depending on an amount of losses that an insurance company has covered in the area;
    determining one or more alternative routes that avoids the area and have risk scores that are less than the first threshold, wherein the risk scores are associated with the driver and based on driving history of the driver and type of the insured vehicle;
    calculating insurance discounts for a policyholder of the insured vehicle for each of the alternative routes that will be applied for taking the corresponding alternative route;
    generating a map of the alternative routes;
    overlaying the insurance discounts on the map for each of the alternative routes;
    for each of the alternative routes on the map: concurrently using a first color scheme indicating a likelihood of being involved in the accident based on the risk scores that are less than the first threshold and a second color scheme indicating a speed of traffic;
    tracking, using at least one of GPS or cell phone triangulation, the insured vehicle to determine whether one of the alternative routes was taken; and
    in response to determining that one of the alternative routes was taken, adjusting an insurance rate according to the corresponding insurance discount for the alternative route.

2. The computerized method of claim 1, further comprising identifying the driver of the insured vehicle to determine a route that the driver of the insured vehicle is expected to drive.

3. The computerized method of claim 1, wherein the area is one of an intersection, a street, a block, or a route.

4. The computerized method of claim 1, wherein identifying that the driver of the insured vehicle expected to drive the insured vehicle through the area further comprises identifying the area as being in a regular route or a route programmed into the insured vehicle.

5. The computerized method of claim 1, further comprising calculating the risk score of the area based on at least one of: street size, number of incidents in the area, severity of the incidents in the area, time of day, demographics of people living or driving near the area, and driving conditions.

6. The computerized method of claim 1, wherein the map with the overlaid insurance discounts is displayed via a communications system in the insured vehicle.

7. A non-transitory computer-readable storage medium comprising a set of instructions that, when executed by one or more processors, cause a machine to:
    identify that a driver of an insured vehicle is expected to drive the insured vehicle through an area with a high risk of being involved in an accident,
        wherein the high risk is a risk with a risk score greater than a first threshold, and wherein the first threshold is varied depending on an amount of losses that an insurance company has covered in the area;

determine one or more alternative routes that avoids the area and have risk scores that are less than the first threshold, wherein the risk scores are associated with the driver and based on driving history of the driver and type of the insured vehicle;

generate a map of the alternative routes;

calculate insurance discounts for a policyholder of the insured vehicle for each of the alternative routes that will be applied for taking the corresponding alternative route;

overlay the insurance discounts on the map for each of the alternative routes;

for each of the alternative routes on the map: concurrently use a first color scheme indicating a likelihood of being involved in the accident based on the risk scores that are less than the first threshold and a second color scheme indicating a speed of traffic;

track the insured vehicle to determine whether one of the alternative routes was taken; and in response to determining that one of the alternative routes was taken, adjust an insurance rate according to the corresponding insurance discount for the alternative route, wherein the insured vehicle is tracked using at least one of GPS or cell phone triangulation.

8. The non-transitory computer-readable storage medium of claim 7, wherein the set of instructions, when executed by the one or more processors, further cause the machine to calculate the risk score of the area based on at least one of: street size, number of incidents in the area, severity of the incidents in the area, time of day, demographics of people living or driving near the area, and driving conditions.

9. The non-transitory computer-readable storage medium of claim 7, wherein the set of instructions, when executed by the one or more processors, further cause the machine to:

determine the one or more alternative routes based on an identity of the driver and wherein identifying the driver of the insured vehicle comprises collecting biometric information from the driver.

10. The non-transitory computer-readable storage medium of claim 7, wherein the area is one of an intersection, a street, a block, or a route.

11. The non-transitory computer-readable storage medium of claim 7, wherein the map is displayed via a communications system in the insured vehicle.

12. An insured vehicle comprising:

a network of detectors adapted to:
  identify a driver of an insured vehicle, and
  monitor a location of the insured vehicle;

a traffic accident analyzation platform comprising computer-readable code that, when executed by one or more processors, programs a processor to:
  identify that the driver of the insured vehicle is expected to drive the insured vehicle through an area of a high risk of being involved in an accident, wherein the high risk is a risk with a risk score greater than a first threshold, and wherein the first threshold is varied depending on an amount of losses that an insurance company has covered in the area,
  determine one or more alternative routes that avoids the area and have risk scores that are less than the first threshold, wherein the risk scores are associated with the driver and based on driving history of the driver and type of the insured vehicle
  calculate insurance discounts for a policyholder of the insured vehicle for each of the alternative routes that will be applied for taking the corresponding alternative route,
  generating a map of the alternative routes,
  overlaying the insurance discounts on the map for each of the alternative routes;
  for each of the alternative routes on the map: concurrently use a first color scheme indicating a likelihood of being involved in the accident based on the risk scores that are less than the first threshold and a second color scheme indicating a speed of traffic,
  track, using at least one of GPS or cell phone triangulation, the insured vehicle to determine whether the alternative route was taken, and
  in response to determining that one of the alternative routes was taken, adjust an insurance rate according to the corresponding insurance discount for the alternative route; and
a display interface configured to display the map.

13. The insured vehicle of claim 12, wherein the computer-readable code, when executed by the one or more processors, further programs the processor to calculate the risk score of the area based on at least one of: street size, number of incidents in the area, severity of the incidents in the area, time of day, demographics of people living or driving near the area, and driving conditions.

14. The computerized method of claim 1, the method further comprising:

determining the risk score by calculating a Getis-Ord GI statistic for each factor in a set of factors affecting a likelihood of being in the accident.

15. The non-transitory computer-readable storage medium of claim 7, wherein the set of instructions, when executed by the one or more processors, further cause the machine to:

determine the risk score by calculating a Getis-Ord GI statistic for each factor in a set of factors affecting a likelihood of being in the accident.

16. The insured vehicle of claim 12, wherein the computer-readable code, when executed by the one or more processors, further programs the processor to determine the first threshold based on an amount of the losses that an insurance company has covered in the location of the insured vehicle.

17. The computerized method of claim 1, further comprising: setting a time period for the driver to avoid certain areas.

18. The computerized method of claim 1, wherein the driving history of the driver includes routes identified as used by the driver above a use threshold amount and wherein the method further comprises:

adjusting the insurance rate in response to the routes, identified as used above a threshold amount, having a risk score of being involved in an accident that is above an accident threshold.

19. The computerized method of claim 1, wherein the driving history is determined by:

predicting one or more routes of the driver based on identifying the driver and a route history of the driver.

20. The computerized method of claim 1, wherein the driving history of the driver includes estimations of a driving skill level of the driver and the method further comprises:

modifying the risk scores based on the estimations of the driving skill level of the driver.

* * * * *